United States Patent [19]

Harris

[11] Patent Number: 4,910,289

[45] Date of Patent: Mar. 20, 1990

[54] NUCLEATING AGENTS FOR POLY(ARYL ETHER KETONE) BLENDS AND COMPOSITIONS OBTAINED THEREFROM

[75] Inventor: James E. Harris, Piscataway, N.J.

[73] Assignee: Amoco Corporation, Chicago, Ill.

[21] Appl. No.: 78,461

[22] Filed: Jul. 27, 1987

[51] Int. Cl.$^4$ ................. C08G 8/02; C08G 14/00
[52] U.S. Cl. .................... 528/125; 528/126; 528/128; 528/219; 525/397; 525/471; 525/537
[58] Field of Search ............... 528/125, 126, 128, 219; 525/397, 471, 537

[56] References Cited

U.S. PATENT DOCUMENTS 4,320,224 3/1982 Rose et al. ...................... 528/125
4,684,699 8/1987 Robeson .......................... 525/537

Primary Examiner—John Kight
Assistant Examiner—M. L. Moore
Attorney, Agent, or Firm—William H. Magidson; Ralph C. Medhurst

[57] ABSTRACT

Described herein are miscible poly(aryl ether ketone) blends possessing increased crystallization rates. The novel compositions contain (a) from about 98 to about 99.9 percent by weight of a miscible poly(aryl ether ketone) blend, and (b) from about 0.1 to about 2 percent by weight of a poly(phenylene sulfide) or a copolymer thereof. The compositions of the instant invention retain their attractive crystallization behavior even after prolonged treatment in the melt. Moreover, these compositions display excellent mechanical properties as well as excellent chemical and heat resistance.

9 Claims, No Drawings

NUCLEATING AGENTS FOR POLY(ARYL ETHER KETONE) BLENDS AND COMPOSITIONS OBTAINED THEREFROM

FIELD OF THE INVENTION

This invention is directed to miscible poly(aryl ether ketone) blends possessing increased crystallization rates. The novel compositions contain (a) from about 98 to about 99.9 percent by weight of a miscible poly(aryl ether ketone) blend, and (b) from about 0.1 to about 2 percent by weight of a poly(phenylene sulfide) or a copolymer thereof. The compositions of the instant invention retain their attractive crystallization behavior even after prolonged treatment in the melt. Moreover, these compositions display excellent mechanical properties as well as excellent chemical and heat resistance.

BACKGROUND OF THE INVENTION

Poly(aryl ether ketones) are known materials which display exceptional high temperature performance. They are crystalline polymers with melting points above 300° C. Two of these crystalline poly(aryl ether ketones) are commercially available and are of the following structure:

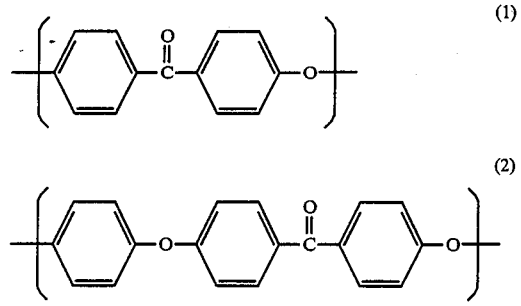

Over the years, there has been developed a substantial body of patent and other literature directed to formation and properties of poly(aryl ethers) (hereinafter called "PAE"). Some of the earliest work, such as by Bonner, U.S. Pat. No. 3,065,205 involves the electrophilic aromatic substitution (e.g., Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, Vol. 5, 1967, pp. 2415-2427; Johnson et al., U.S. Pat. Nos. 4,107,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, Vol. 22, August, pp. 1096-1103; Blundell et al., Polymer 1983, Vol. 24, August, pp. 953-958; Atwood et al., Polymer Preprints, 20, No. 1, April 1979, pp. 191-194; and Rueda et al., Polymer Communications, 1983, Vol. 24, September, pp. 258-260. In early to mid-1970, Raychem Corporation commercially introduced a PAEK called Stilan ®, a polymer whose cronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEK's are well known; they can be synthesized from a variety of starting materials; and they can be made with different melting temperatures and molecular weights. The PAEK's are crystalline, and as shown by the Dahl and Dahl et al. patents, supra, at sufficiently high molecular weights they can be tough, i.e., they exhibit high values (>50 ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers, and thus would be classed as expensive polymers.

These poly(aryl ether ketones) exhibit an excellent combination of properties; i.e., thermal and hydrolytic stability, high strength and toughness, wear and abrasion resistance and solvent resistance. Thus, articles molded from poly(aryl ether ketones) have utility where high performance is required. However, in some applications, such as those where the poly(aryl ether ketone) is to be used as a thermoplastic composite matrix resin, its glass transition temperature (Tg) may not be as high as desired for the particular application. This is because polymers, even crystalline polymers, exhibit excessive loss of modulus, strength and creep resistance above their Tg's. This loss in properties may not be acceptable in cases where the materials are to be used as thermoplastic composite matrix resins.

In order to alleviate this situation, various miscible blends of the PAEK's with other thermoplastics, having higher glass transition temperatures than the poly(aryl ether ketones), have been developed.

It is known, that polymers are generally immiscible, and that it is for all practical purposes, impossible to predict whether a given polymer pair will yield a miscible blend. However, according to Olabisi, et al., Polymer-Polymer Miscibility, 1979, published by Academic Press, New York, N.Y., p. 120:

"The most commonly used method for establishing miscibility in polymer-polymer blends or partial phase mixing in such blends is through determination of the glass transition (or transitions) in the blend versus those of the unblended constituents. A miscible polymer blend will exhibit a single glass transition between the Tg's of the components with a sharpness of the transition similar to that of the components."

It is important to note that miscible blends of PAEK's with higher Tg thermoplastics, are a route of choice to resins having the desired high glass transition temperatures that are required in composites applications, provided of course, that the thermoplastics in question display good toughness and heat and chemical resistance.

Such preferred miscible blends are described in patent applications Ser. Nos. 945,799 now abandoned and 008,696; both filed in the name of James E. Harris et al., on Dec. 24, 1986 and on Jan. 30, 1987 respectively; titled "Miscible Blends of A Poly(Aryl Ether Ketone) and An Imide-Containing Polymer", and "Blends of a Poly(Aryl Ketone) and a Poletherimide" and both commonly assigned.

In order to achieve optimum properties it is important that the crystallinity of the material be developed as far as possible during the fabrication process. This is due to the fact that subsequent use of an article which can continue to crystallize in use can result in dimensional changes occurring in the article with consequent warping or cracking and general change in physical properties. Moreover, in some applications, it is important to achieve a uniformity of crystalline texture and to maximize the number of crystallites regardless of increasing the rate of crystallization.

Crystallization rates are often a problem with crystalline homopolymers, even with the highly crystalline poly(aryl ether ketones). Crystallization rates are even more critical in miscible blends containing a poly(aryl ether ketone and an amorphous polymer, such as for example, a poly(ether imide) or certain polyimides and poly(amideimides). The presence of the second polymer component retards crystallization and, hence, the development of optimum toughness, optimum chemical, and heat resistance.

It is, therefore, highly desirable to develop new rapidly crystallizing miscible poly(aryl ether ketone) blend compositions, while retaining at the same time, all of the other attractive features of this class of polymers.

European Patent Application No. 152,161 describes poly(aryl ether ketones) having high crystallization rates. This is achieved by providing the polymer with ionic end-groups. In another embodiment, fast crystallization is achieved by blending a poly(aryl ether ketone) which does not contain terminal ionic groups with a material having such terminal groups.

DESCRIPTION OF THE INVENTION

It was now unexpectedly discovered that significantly improved crystallization rates are obtained with compositions comprising (a) from about 98 to about 99.9 percent by weight of a miscible poly(aryl ether ketone) blend with a polyetherimide, certain poly(amide-imides) and/or polyimides, and (b) from about 0.1 to about 2.0 percent by weight of poly(phenylene sulfide) or of a copolymer thereof.

The discovery that such small amounts of the additive (<2 weight percent) are effective in promoting fast crystallization rates was totally unexpected. It was unexpected that the additive is effective with the poly(aryl ether ketone) blends but not with the poly(aryl ether ketones) themselves. One would obviously expect the crystalline poly(aryl ether ketone) to be more amenable to crystallization than its blend with an amorphous polymer; the latter is expected to exercise a strong retarding effect on crystallization and, thus, hinder the development of optimum properties of the alloy.

It is also quite unexpected that poly(phenylene sulfide) (PPS) has a low melting point (about 270° C.) and would, therefore, be present as a liquid and not as a solid crystal in the molten PAEK-based mixtures. On the other hand, such solid materials as talc or calcium molybdate have a much less pronounced accelerating effect on the crystallization rate of the subject PAEK-containing blends.

It is noted that the additive contains no ionic groups. These groups may have undesirable effects on polymer stability or on other polymer properties.

The compositions of the instant invention retain their attractive crystallization behavior even after prolonged treatment in the melt.

The crystalline poly(aryl ether ketones) which are suitable for use herein can be generically characterized as containing repeating units of one or more of the following formulae:

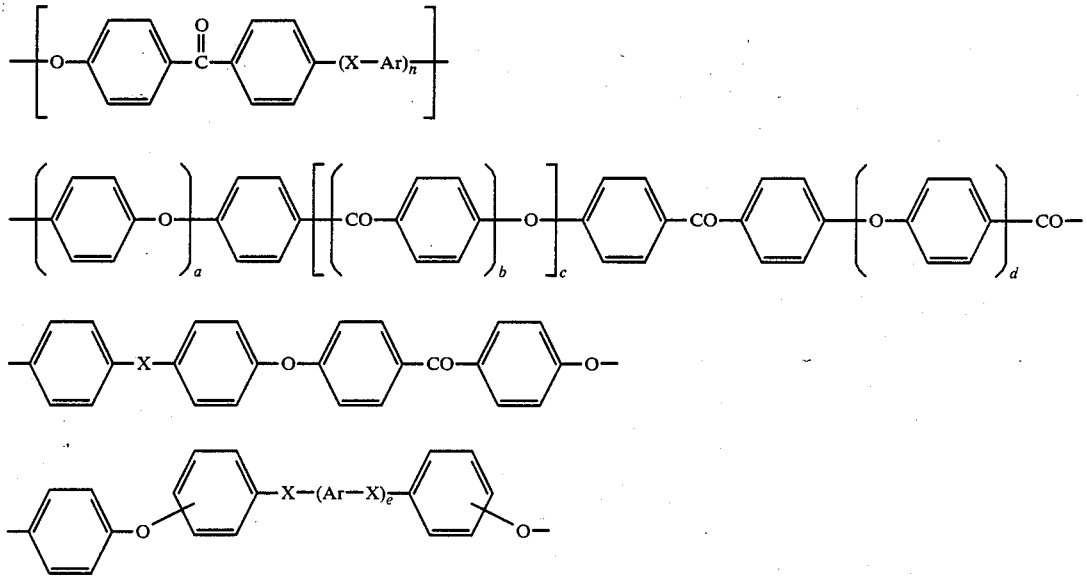

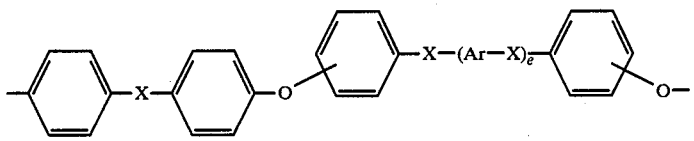
wherein Ar is independently a divalent aromatic radical selected from phenylene, biphenylene or naphthlene, and the like; X is independently O,
or a direct bond and n is an integer of from 0 to 3; b, c, d and e are 0 to 1; and a is an integer of 1 to 4 and preferably d is 0 when b is 1.
Preferred poly(aryl ether ketones) include those having repeating units of the formula:
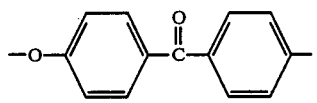
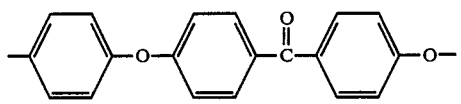
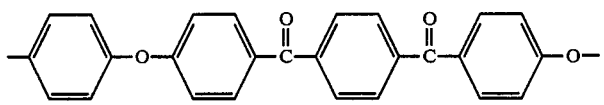
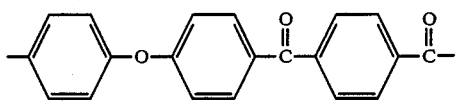
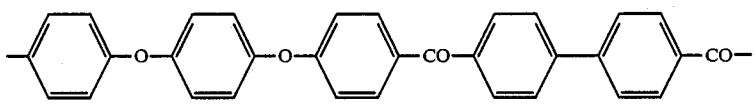
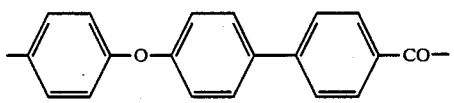
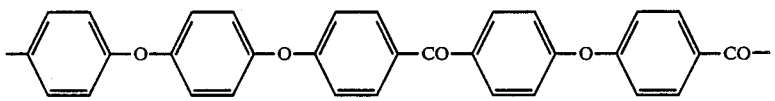
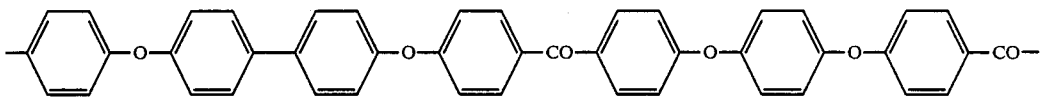
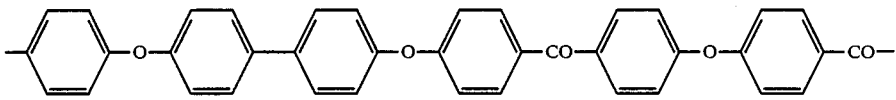
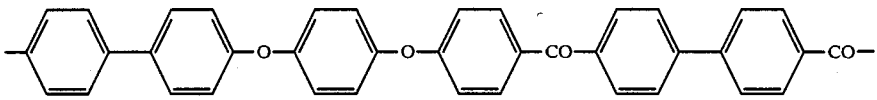

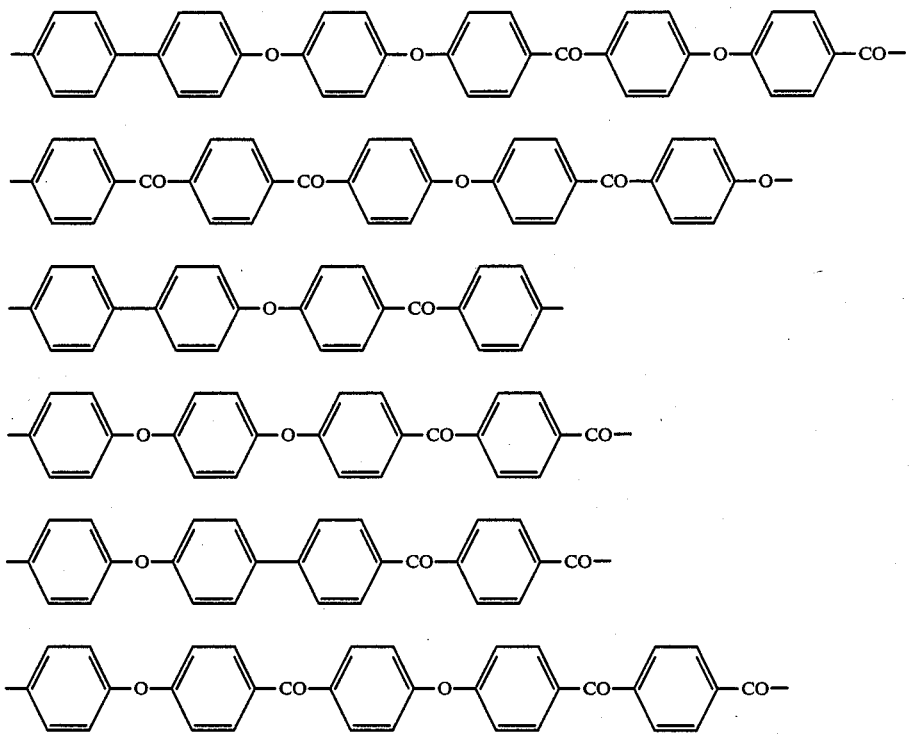

The poly(aryl ether ketones) of the instant invention are prepared by methods well known in the art. One such method comprises heating a substantially equimolar mixture of at least one bisphenol and at least one dihalobenzenoid compound and/or at least one halophenol compound.

Typical bisphenols useful in such a process include: 4,4'-dihydroxybiphenyl, 2,6-dihydroxy naphthalene, other isomeric dihydroxy naphthalenes, 1,5-dihydroxy anthracene, other isomeric dihydroxy anthracenes, dihydroxy terphenyls, 4,4-dihydroxybenzophenone, and 4,4-dihydroxydiphenyl ether. Diphenols such as hydroquinone may also be used.

Hydroquinone, 4,4'-dihydroxybenzophenone, 4,4'-dihydroxydiphenyl ether and 4,4'-dihydroxybiphenyl are the preferred dihydric phenols.

Typical dihalobenzenoid and halophenol compounds include:
4-(4'-chlorobenzoyl)phenol,
4-(4'-fluorobenzoyl)phenol,
4,4'-bis(4''-fluorobenzoyl)diphenyl,
1,5-bis(4'-fluorobenzoyl)naphthalen,
2,6-bis(4'-fluorobenzoyl)naphthalen,
2,7-bis(4'-fluorobenzoyl)naphthalene,
2,6-; 2,7-bis(4'-fluorobenzoyl)anthracenes,
4,4'-difluorobenzophenone,
4,4'-dichlorobenzophenone,
4-chloro-4'-fluorobenzophenone,
1,4-bis(4'-fluorobenzoyl)benzene,
1,3-bis(4-fluorobenzoyl)benzene, and
4,4'-bis(4''-fluorobenzoyl)diphenyl ether.
4-(4'-fluorobenzoyl)phenol, 4,4'-difluorobenzophenone, 1,4-bis(4'-fluorobenzoyl)benzene,
4,4'-bis(4''-fluorobenzoyl)diphenyl ether and
4,4'-bis(4''-fluorobenzoyl)diphenyl, are preferred.

The poly(aryl ether ketones) may be produced by the process as described in, for example, U.S. Pat. No. 4,176,222. This process comprises heating in the temperature range of 100° to 400° C.,
(a) a substantially equimolar mixture of
(i) at least one bisphenol, and
(ii) at least one dihalobenzenoid compound and/or
(b) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ether ketones) such as those containing repeating units of the formula:

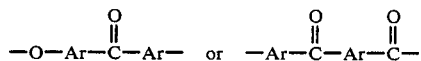

where Ar is as defined previously, may be produced by Friedel-Craft reactions utilizing hydrogen fluoride-boron trifluorid catalysts as described, for example, in U.S. Pat. Nos. 3,953,400; 3,441,538; 3,442,857 and 3,516,966.

The polyketones may also be prepared according to the process as described in, for example, U.S. Defensive Publication No. T-103,703 and U.S. Pat. No. 4,396,755. In such processes, reactants such as
(a) an aromatic monocarboxylic acid;

(b) a mixture of at least one aromatic dicarboxylic acid and an aromatic hydrocarbon; and (c) combinations of (a) and (b) are reacted in the presence of a fluoroalkane sulphonic acid, particularly trifluoromethane sulphonic acid.

The poly(aryl ether ketones) of the following formulae:

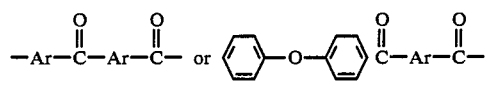

may also be prepared according to the process as described in U.S. Pat. No. 4,398,020. In such a process, (a) a mixture of substantially equimolar amounts of
(i) at least one aromatic diayl halide of formula

where —$Ar_1$— is a divalent aromatic radical such as 1,4-phenylene, 4,4'-biphenylene, terphenylene, naphthylene, anthracenylene, and the like; Y is halogen, preferably chlorine; and COY is an aromatically bound acyl halide group, which diacyl halide is polymerizable with at least one aromatic compound of (a) (ii), and (ii) at least one aromatic compound of the formula

wherein H—Ar'—H is an aromatic compound such as biphenyl, terphenyl, naphthalene anthracene, or diphenyl ether; and H is an aromatically bound hydrogen atom, which compound is polymerizable with at least one diacyl halide of (a) (i), or (b) at least one aromatic monacyl halide of the formula

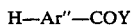

where H—Ar"—H is an aromatic compound such as biphenyl, terphenyl, naphthalene, anthracene, diphenoxybiphenyl, diphenyl ether, diphenoxy-naphthalene, diphenoxy-anthracene, and diphenoxy-benzene; and H is an aromatically bound hydrogen atom; Y is halogen, preferably chlorine; and COY is an aromatically bound acyl halide group, which monacyl halide is self-polymerizable, or (c) a combination of (a) and (b) is reacted in the presence of a fluoroalkane sulphonic acid.

Additionally, the polymers may be prepared by Friedel-Crafts processes a described in, for example, U.S. Pat. Nos. 3,065,205; 3,419,462; 3,441,538; 3,442,857; 3,516,966 and 3,666,612. In these patents, a PAEK is produced by Friedel-Crafts polymerization techniques using Friedel-Crafts catalysts such as aluminum trichloride, zinc chloride, ferric bromide, antimony pentachloride, titanium tetrachloride, etc., and a solvent.

A typical preferred organic solvent is 1,2-dichloroethane. Other solvents such as symmetrical tetrachloroethane, o-dichlorobenzene, hydrogen fluoride, methylene chloride, trichloroethylene, or carbon disulfide may be employed. Co-solvents such as nitromethane, nitropropane, dimethyl formamide, sulfolane, etc. may be used. Concentrations as low as 3 to as high as 40 weight percent may be used.

The reactions may be carried out over a range of temperatures which are from about −40° C. to about 160° C. In general, it is preferred to carry out the reactions at a temperature in the range of −10° C. to about 30° C. In some cases it is advantageous to carry out the reactions at temperatures above 30° C. or below −10° C. Most preferably, the reaction are carried out at temperatures below about 0° C. The reactions may be carried out at atmospheric pressure although higher or lower pressures may be used. Reaction times vary depending on the reactants, etc. Generally, reaction times of up to 6 hours or longer are preferred.

The term poly(aryl ether ketone) as used herein, is meant to include homopolymers, copolymers, terpolymers, graft copolymers, and the like.

The poly(aryl ether ketones) have a reduced viscosity of at least about 0.4 to about 5.0 dl/g, as measured in concentrated sulphuric acid at 25° C.

The blends whose crystallization rates are being improved herein may, in principle, contain any polymer that is miscible with poly(aryl ether ketones). Of particular interest are mixtures that contain polyetherimides, certain poly(amide-imides) or certain polyimides. The poly(aryl ether ketones) and the polyetherimides, poly(amide-imides) or polyimides may each be used in the blends of the instant invention in amounts of from about 2 to about 98 weight percent, preferably from about 20 to about 80 weight percent.

The polyetherimides suitable for use in this invention are well known in the art and are described in, for example, U.S. Pat. Nos. 3,847,867; 3,838,097; and 4,107,147.

The polyetherimides are of the formula (3):

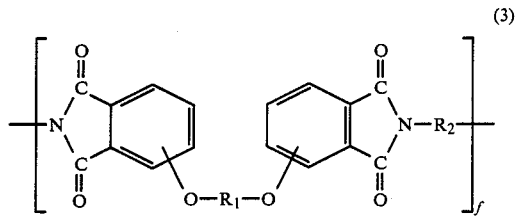

(3)

wherein f is an integer greater than 1, preferably from about 10 to about, 10,000 or more; —O—$R_1$—O— is attached to the 3 or 4 and 3' or 4' positions and $R_1$ is selected from (a) a substituted or unsubstituted aromatic radical such as:

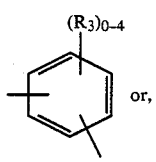
or,
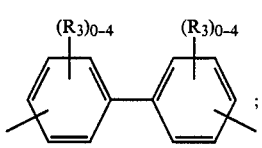

(b) a divalent radical of the formula:

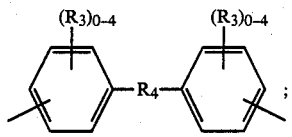

wherein R$_3$ is independently C$_1$ to C$_6$ alkyl, aryl or halogen and R$_4$ is selected from —O—, —S—,

—SO$_2$—, —SO—, alkylene or 1 to 6 carbon atoms, cycloalkylene of 4 to 8 carbon atoms, alkylidene of 1 to 6 carbon atoms, or cycloalkylidene of 4 to 8 carbon atoms; R$_2$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cyclo alkylene radicals having from 2 to 20 carbon atoms and C$_2$ to C$_8$ alkylene terminated polydiorganosiloxane or a divalent radical of the formulae:

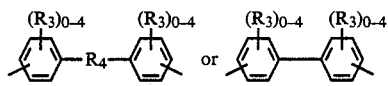

wherein R$_3$ and R$_4$ are as previously defined.

The polyetherimides may also be of the following formula:

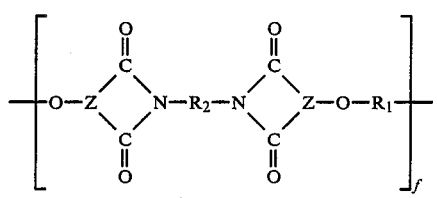

(4)

wherein —O—Z is a member selected from

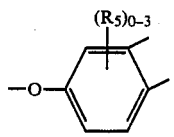

wherein R$_5$ is independently hydrogen, lower alkyl or lower alkoxy

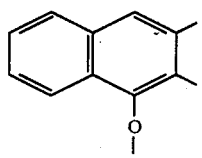

or isomers thereof, and

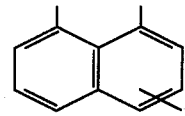

or isomers thereof wherein the oxygen may be attached to either ring and located ortho or para to one of the bonds of the imide carbonyl groups, and wherein R$_1$ and R$_2$ and f are as previously defined.

These polyetherimides are prepared by methods well known in the art as set forth in, for example, U.S. Pat. Nos. 3,833,544; 3,887,588; 4,017,511; 3,965,125; and 4,024,110.

The polyetherimides of formulae (3) and (4) can, for example, be obtained by any of the methods well known to those skilled in the art including the reaction of any aromatic bis-(ether anhydride)s of the formula:

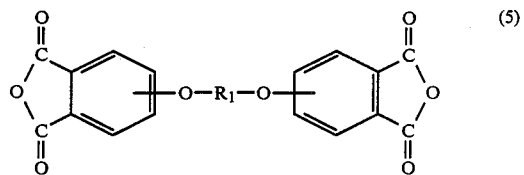

(5)

wherein R$_1$ is as defined hereinbefore, with a diamino compound of the formula

H$_2$N—R$_2$—NH$_2$ (6)

wherein R$_2$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of formula (5) with any diamino compound of formula (6) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and types of ingredients used. In general, equimolar amounts of diamine and dianhydride are employed for high molecular weight polyetherimides; however, in certain instances, slight molar excess (about 1 to 5 mole percent) of one of the reagents can be employed. Polyetherimides of formula (3) having an intrinsic viscosity of greater than 0.2 deciliters per gram, preferably 0.35 to 0.60, or 0.7 deciliters per gram or even higher when measured in m-cresol at 25° C., are the most useful.

The aromatic bis(ether anhydride)s of formula (5) include, for example:

2,2-bis[4-(2,3-dicarboxyphenoxy)phenyl]-propane dianhydride;

4,4'-bis(2,3-dicarboxyphenoxy)diphenyl ether dianhydride;

1,3-bis(2,3-dicarboxyphenoxy)benzene dianhydride;
4,4'-bis(2,3-dicarboxyphenoxy)iphenyl sulfide dianhydride;
1,4bis(2,3-dicarboxyphenoxy)benzene dianhydride;
4,4'-bis2,3-dicarboxyphenoxy)benzophenone dianhydride;
4,4'-bis(2,3-dicarboxyphenoxy)diphenyl sulfone dianhydride;
2,2'-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl;
2,2-propane dianhydride; etc., and mixtures of such dianhydrides.

The organic diamines of formula (6) include, for m-phenylenediamine, p-phenllenediamine,
2,2-bis(p-aminophenyl)propane,
4,4'-iaminodiphenyl-methane,
4,4'-diaminodiphenyl sulfide,
4,4'-diaminodiphenyl sulfone,
4,4'-diaminodiphenyl ether,
1,5-diaminonaphthalene,
3,3'-dimethylbenzidine, and
3,3'-dimethoxybenzidine; or mixtures of such diamines.

The polyetherimides of formulae (3) and (4) may also be prepared by effecting reaction in the presence of a dipolar aprotic solvent of a mixture of ingredients comprising, (a) a bis(nitrophthalimide) of the general formula:

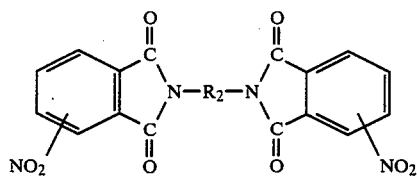  (7)

wherein $R_2$ is defined as hereinabove, and (b) an alkali metal salt of an organic compound of the general formula:

MO—$R_1$—OM    (8)

wherein M is an alkali metal an $R_1$ is defined as hereinabove.

The bis(nitrophthalimide) used in preparing the polymer is formed by reacting a diamine of the formula described above, $NH_2$—$R_2$—$NH_2$, with a nitro-substituted aromatic anhydride of the formula:
The molar ratio of diamine to anhydride should ideally be

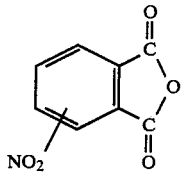  (9)

about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalene-dicarboxylic anhydride and 3-methoxy-6-nitrophthalic anhydride, and the like.

With reference to the alkali metal salts of formula (8) among the divalent carboxylic aromatic radicals which $R_1$ may represent (mixtures of such radicals are also included) of particular interest are, for instance, the divalent aromatic hydrocarbon radicals having from 6 to 20 carbon atoms, such as phenylene, biphenylene, naphthylene, etc. Included are residues of, e.g., hydroquinone, resorcinol, chlorohydroquinone, etc. In addition, $R_1$ may be a residue of a dihydroxyl diarylene compound in which the aryl nuclei are joined by either an aliphatic group, a cycloaliphatic group, a sulfoxide group, sulfonyl group, sulfur, carbonyl group, oxygen, a chemical bond, etc. Typical of such diarylene compounds are the following:
2,4-dihydroxydiphenylmethane,
bis(2-hydroxyphenyl)methane,
2,2-bis(4-hydroxyphenyl)propane,
bis(4-hydroxyphenyl)methane,
bis(4-hydroxy-5-nitrophenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(2,5-dimethyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(4-hydroxynaphthyl)propane;
the naphthalene diols; and
bis(4-hydroxyphenyl)ether,
bis(4-hydroxyphenyl)sulfide,
bis(4-hydroxyphenyl)sulfone, and the like.

When dialkali metal salts of formula (8) are used with the compound illustrated by formula (7), the ingredients are advantageously present in an equal molar ratio for optimum molecular weight and properties of the polymer. However, slight molar excesses, e.g., about 0.001 to 0.10 molar excess of either the dinitro-substituted organic compound or of the dialkali metal salt of formula (8) may be employed. When the molar ratios are approximately equal, the polymer is substantially terminated by the end group Z—$NO_2$ at one end and by a phenolic group at the other end. If there is a molar excess of one compound, that particular terminal group will predominate.

The conditions of reaction whereby the alkali-metal salt of formula (8) is reacted with the dinitro-substituted organic compound of formula (7) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed a which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g., methanol, ethanol, isopropyl alcohol, etc.) and aliphatic hydrocarbons (e.g., pentane, hexane, octane, cyclohexane, etc.) may be employed as precipitates for this purpose.

It is important that the reaction between the dinitro-substituted organic compound of formula (7) and the alkali-metal salt of formula (8) (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent dipolar apotic solvent or mixture of such solvent with an aromatic solvent sufficient to give a final solution containing 10 to 20 percent by weight of polymer is preferably employed.

The preferred polyetherimides include those having repeating units of the following formula:

-continued

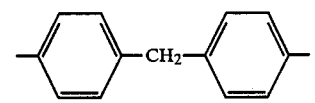

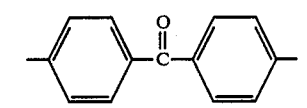

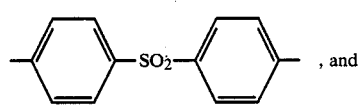

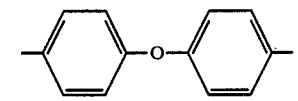

The polyetherimide where $R_2$ is meta-phenylene is most preferred.

The poly(amide-imides) or polyimides useful in the instant invention isoalkylidene, preferably isopropylidene bridges and are derived from at least one polycarboxylic acid or derivative thereof having the formula:

$$R_6(COOH)_n \qquad (11)$$

and/or from at least one diamine having the formula:

$$H_2N-Ar_2-NH_2 \qquad (12)$$

In the formulae above, n can be 3 or 4; $R_6$ is a tri-, or tetravalent aromatic radical, preferably

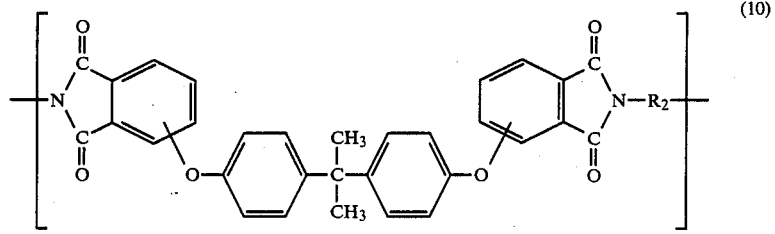

(10)

wherein $R_2$ is selected from

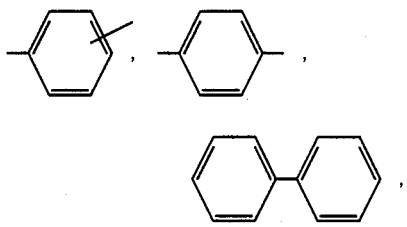

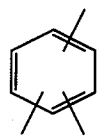

or the corresponding radicals derived from naphthalene, and

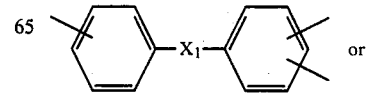 or

-continued

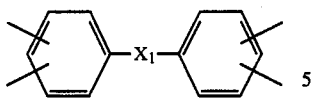

wherein $X_1$ is a chemical bond, O, S, SO, $SO_2$, CO,

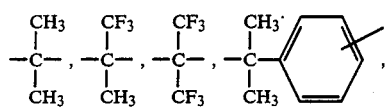

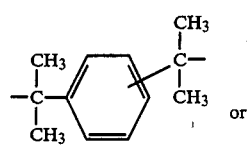
or

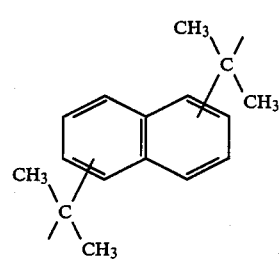
and isomers thereof.

$Ar_2$ is the radical

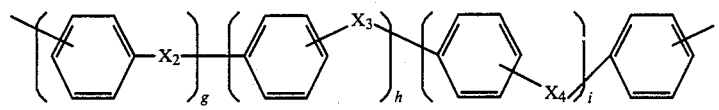

and/or the radical

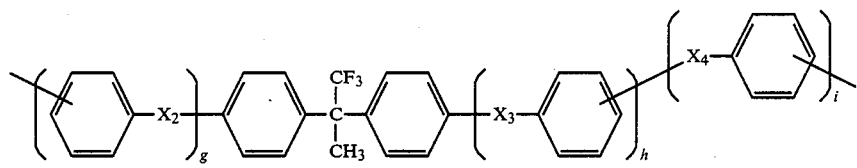

wherein g, h and i are independently 0 and 1, and wherein $X_2$, $X_3$, and $X_4$ may independently take on the same values as $X_1$.

Within the scope of this invention, preferred polyimides are represented by the formula

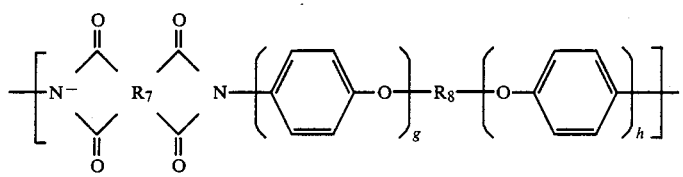

wherein $R_7$ is

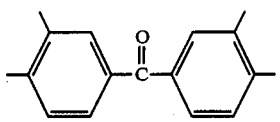

and $R_8$ is

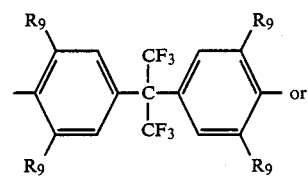

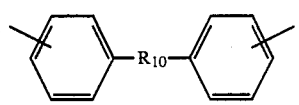

and g and h are 0 or 1 and may be the same or different, $R_9$ is a $C_1$ to $C_5$ alkyl radical, and $R_{10}$ is a divalent, saturated or unsaturated aliphatic hydrocarbon radical, particularly an alkylene or alkylidene radical having 1 to 3 carbon atoms or a cycloalkylidene or cycloalkylene radical having up to and including 9 carbon atoms, and/or they are at least one thermoformable polyimide made from the following dianhydride:

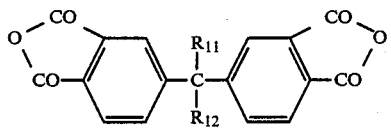

where $R_{11}$ and $R_{12}$ are $CF_3$ or $CH_3$ and may be the same or different.

The imide containing polymers can be homopolymers, random copolymers, and block copolymers. Moreover, according to the instant invention, the polyimide or polyamideimide should contain at least 3 percent by weight, and preferably 7 percent by weight of isoalkylidene, preferably isopropylidene bridges.

It should be noted that the imide containing polymers may be based on more than one diamine and/or on more than one polycarboxylic acid.

The polymers are prepared by methods well known in the art. The preparation of the imide-containing materials is set forth, for example, in U.S. Pat. Nos. 3,208,458; 3,652,409; 3,179,634; 3,972,902; 3,355,427; 4,485,140; and 4,111,906. The polyimides may be prepared, for example, by reacting at temperatures ranging from ambient to about 175° C., an organic diamine with a tetracarboxylic acid diahhydride. Alternatively, a tetracarboxylic acid dianhydride can be reacted with a diisocyanate, in place of the diamine. Reaction of an isocyanate with the anhydride group yields a seven membered cyclic intermediate which spontaneously collapses to form the imide with evolution of carbon dioxide. Similar reactions are used for the preparation of the poly(amide-imides) except that a tricarboxylic acid monoanhydride or derivative thereof is used instead of the tetracarboxylic acid dianhydride.

In addition to the reaction of a diamine with a tricarboxylic acid monoanhydride or derivative thereof, the poly(amide-imides) of the instant invention may also be prepared via the routes shown in equations (I)–(IV). The chemistry of these routes is the same as that described above for the preparation of the poly(amide-imides), and polyimides. Note that the terms dicarboxylic acid, tricarboxylic acid monoanhydride, and diamine are meant to include appropriately reactive derivatives thereof as required for the polymerizations. Thus, the term dicarboxylic acid includes also, the corresponding acid chloride; the term diamine includes also, the corresponding di-N-acylated derivative. These latter materials were shown to be very useful for the preparation of poly(amide-imides)...see Keske, Polymer Preprints, Vol. 25, No. 2, p. 12 (1984).

Dianhydride of a + dicarboxylic acid +     (I)
tetracarboxylic
acid

diamine ⟶ poly(amide-imide)

Tricarboxylic acid + dicarboxylic acid +     (II)
monoanhydride

diamine ⟶ poly(amide-imide)

Tricarboxylic acid + dianhydride of a +     (III)
monoanhydride   tetracarboxylic
                      acid

diamine ⟶ poly(amide-imide)

Tricarboxylic acid + dianhydride of a + dicarboxylic acid +     (IV)
monoanhydride   tetracarboxylic
                      acid

diamine ⟶ poly(amide-imide).

The materials useful in equations (I)–(IV) are $R_6(COOH)_n$ and $H_2N\,Ar_2\,NH_2$ wherein $R_6$, $Ar_2$, and n are as defined above. An additional reactant is the dicarboxylic acid $R_{13}(COOH)_2$ wherein $R_{13}$ is

and/or

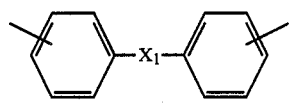

and wherein $X_1$ is as defined above. As indicated before, the imide containing polymers which show the unusual and unexpected ability for form compatible blends with poly(aryl ether ketones) are based on monomers that possess isopropylidene bridges within their molecules. At least one of the reactants, i.e., either the polycarboxylic acid or the diamine must contain a group:

Note that in addition to $R_6(COOH)_n$, $R_{13}(COOH)_2$ and $H_2N\,Ar_2\,NH_2$ as defined above, the reactants may comprise up to 50 mole percent, preferably up to 25 mole percent, and most preferably not more than about 15 mole percent of other polycarboxylic acid and/or diamine components, such as pyromellitic dianhydride, for example.

As indicated above, the amide- and imide-based polymers that are useful in the instant invention are prepared from monomers that contain isoalkylidene, preferably isopropylidene bridges. The starting materials for the preparation of these monomers are typically the derivatives (13) or preferably (14).

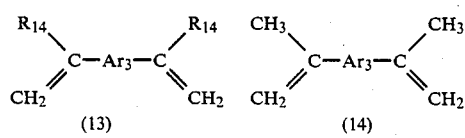

In the formulae above, $R_{14}$ is an alkyl group having from 1 to 10 carbon atoms and is preferably methyl; $Ar_3$ is

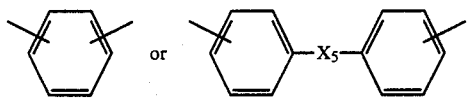

where X₅ is a chemical bond, O, SO, SO₂,

CH₂, or an alkylidene group having from 2 to 8 carbon atoms; or

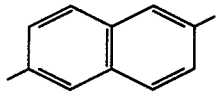 or isomers thereof.

The acid-catalyzed condensation of (13) or of (14) with aniline leads to the desired diamino monomers. Friedel-Crafts reaction of (13) or of (14) with e.g., o-xylene, followed by oxidation and dehydration yields dianhydrides containing isoalkylidene or isopropylidene bridges. Similar approaches can be used to prepare the tricarboxylic acid monoanhydrides having isoalkylidene or isopropylidene groups within their molecules.

The poly(phenylene sulfides) suitable for the purposes of the instant invention are solids, having a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylene sulfide).

The resulting polymer contains the aromatic nucleus of the polyhalo-substituted monomer coupled in repeating units predominantly through a sulfur atom. The polymers which are preferred for use according to this invention are those polymers having the repeating unit —R—S— where R is phenylene, biphenylene, naphthylene, or a lower alkyl-substituted derivative thereof. By "lower alkyl" is meant alkyl groups having one to six carbon atoms such as methyl, propyl, isobutyl, n-hexyl and the like.

The preferred poly(arylene sulfide) is poly(phenylene sulfide), a crystalline polymer with a repeating structural unit comprising a para-substituted benzene ring and a sulfur atom which may be described by the following formula, where n has a value of at least about 5.

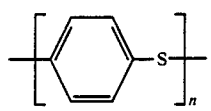 (15)

Suitable poly(phenylene sulfide) compositions are available commercially under the tradename RYTON of the Phillips Petroleum Company.

The term poly(arylene sulfide) is meant to include not only homopolymers but also normally solid arylene sulfide copolymers, terpolymers and the like.

An example of copolymers that are useful for the purposes of the instant invention are the materials disclosed in Japanese Patent Application No. 61/231,030. The latter contain units (15) and (16).

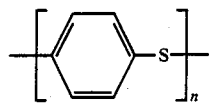 (15)

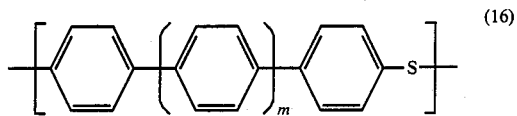 (16)

where m is 0 or 1.

The compositions of this invention are prepared by any conventional mixing methods. For example, a preferred method comprises mixing the poly(aryl ether ketone) blend with the poly(phenylene sulfide) polymer additive in powder or granular form in an extruder and extruding the mixture into strands, chopping the strands into pellets and molding the pellets into the desired article.

The compositions of this invention may include mineral fillers such as carbonates including chalk, calcite and dolomite; silicates including mica, talc, wollastonite, silicon dioxide; glass spheres; glass powders; aluminum; clay; quartz; and the like. Also, reinforcing fibers such as fiberglass, carbon fibers, and the like may be used. The compositions may also include additives such as titanium dioxide; thermal stabilizers, ultraviolet light stabilizers, plasticizers, and the like.

The blends of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

DESCRIPTION OF THE POLYMERS

Polyphenylene sulfide

The polyphenylene sulfide (PPS) was obtained from Phillips Chemical Company under the tradename of RYTON ® P-4. The resin had a melt flow index of 25 g/10 minutes at 300° C. and 44 psi when measured according to ASTM D-1238. Its melting point as measured with a Perkin-Elmer DSC-2 calorimeter was 278° C. The DSC scan rate was 10° C./minute and the melting point was taken at the endotherm peak.

Poly(aryl ether ketone) I

Poly(aryl ether ketone) I was VICTREX ® 450G obtained

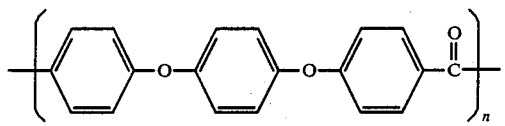

from ICI Americas, Inc. The resin had a melt flow index of 3 g/10 minutes at 44 psi and 400° C. Its melting point was 337° C.

Poly(aryl ether ketone) II

Poly(aryl ether ketone) II was a copolymer of the following structure:

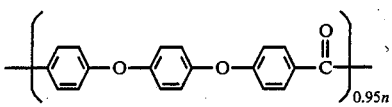

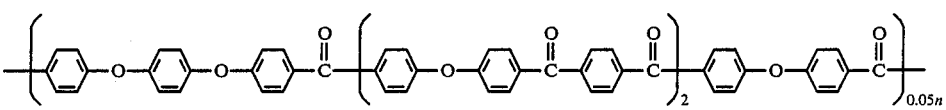

It was prepared using the difluoro-terminated poly(aryl ether ketone) oligomer of the formula

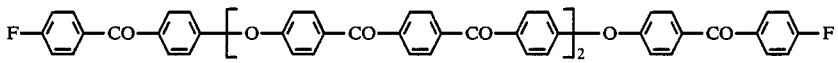

The average molecular weight of the above oligomer was calculated by determining its fluorine content (%F) and using the equation $$M \cdot Wt = \left( \frac{2 \times \text{atomic weight of fluorine}}{\%F} \right) \times 100$$

A glass 250 ml. round bottomed flask equipped with a nitrogen inlet, temperature probe, Claisen adapter, addition funnel, Dean-Stark trap, condenser, heating mantles (upper and lower), and a mechanical stirrer was charged with
- 0.003 moles of the difluoro-monomer,
- 12.44 g (0.0570 moles) of difluorobenophenone,
- 6.61 g (0.0600 moles) of hydroquinone,
- 6.36 g (0.0600 moles) of sodium carbonate,
- 0.298 g (0.00513 moles) of potassium fluoride, and
- 60 g of diphenyl sulfone.

The flow of N₂ was started and the mixture was heated until it began to liquefy. At this pint, 25 ml of xylene were added via the addition funnel, and the Dean-Stark trap was filled with xylene. Stirring was begun and the mixture was heated to 200° C. over a period of about one hour. Xylene was removed from the system as necessary to increase the temperature of the reaction mixture. Enough xylene was however, kept in the system to maintain a steady reflux.

The mixture was maintained at 200° C. for 30 minutes. During this time water-rich xylene was drained slowly from the Dean-Stark trap and replenished with fresh xylene via the addition funnel. The temperature was then increased to 250° C. over about 45 minutes, removing xylene from the system as necessary.

After 30 minutes at 250° C., the mixture was heated to 300° C. Addition of xylene was discontinued at about 260°-270° C. and all of the xylene was drained from the Dean-Stark trap. The mixture was kept at 300° C. until viscous, and hen terminated by the addition of lithium chloride (0.432 g, 0.0102 moles) and diphenyl sulfone (2 g), followed after 15 minutes by 0.389 g (0.00121 moles) of the difluoro diketone

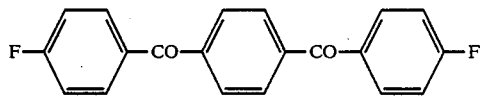

and a small amount of diphenyl sulfone. After stirring for an additional 15 minutes, the reaction mixture was poured into an aluminum pan, allowed to cool, broken-up, and ground to a powder. The crude product was extracted twice with 700 ml of refluxing acetone, twice with 700 ml of boiling water, and once with 700 ml of refluxing acetone (each extraction 1.5 hours) to give the final product.

The polymer had a melt flow index of 7 g/10 minutes at 400° C. and 44 psi,and its melting point was 343° C.

Polyetherimide

The polyetherimide had the following structure:

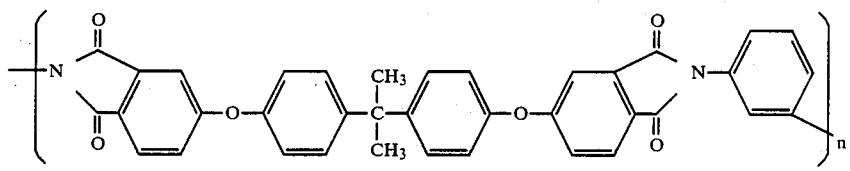

and was obtained from General Electric Co. as ULTEM ® 1000. The resin had an R.V. of 0.51 dl/g (0.2 g per 100 ml solution) as measured in chloroform at 25° C.

Control A

A blend of 50% of poly(aryl ether ketone) I and 50% of the polyetherimide was made in a Brabender Plasticorder mixer at 350° C. The blend was fluxed for 5 minutes and then pressed into a thin (ca. 5 mil) film. The blend was found to be miscible as described in World Patent publication 8501-509A. Samples of this film were heated to 400° C. at 10° C./min in a DSC-2 calorimeter and the melting point, Tm and heat of fusion, ΔHf determined. The Tm was taken as the maximum in the melting endotherm. Samples were then cooled from 400° C. at 10° C./min. Tc was determined at this cooling rate as the temperature at which the maximum rate of crystallization occurred. Samples were also heated to 400° C. and then cooled at 120° C./minute to Tx, the crystallization temperature. The time at Tx for the maximum in the crystallization rate to occur was recorded as tc. The results are shown in Table I.

Example I

A blend of 49.5% of poly(aryl ether ketone) I, 49.5% of the polyetherimide of Control A and 1% of polyphenylene sulfide was mixed in a Brabender Plasticorder mixer at 350° C. and pressed into a film as in Control A. It was tested as in Control A and the results are shown in Table I.

Comparative Example II

A blend of 49.5% of poly(aryl ether ketone) I, 49.5% of the polyetherimide of Control A and 1% of talc was mixed in a Brabender Plasticorder mixer at 350° C. and pressed into a film as. shown in Control A. It was tested as in Control A and the results are shown in Table I.

TABLE I

|  | Control A | Example I | Comparative Example II |
|---|---|---|---|
| Nucleation Aid | none | PPS | Talc |
| Tm (°C.) | 337 | — | — |
| ΔHf (cal/g) | 9.0 | — | — |
| Tc # 10° C./min | 246 | 265 | 258 |
| tc # 290° C. (sec) | 589 | 339 | 319 |
| tc # 280° C. | 221 | 155 | 181 |
| tc # 270° C. | 123 | 93 | 121 |
| tc # 260° C. | 108 | 60 | 88 |
| tc # 250° C. | 106 | 58 | 140 |
| tc # 240° C. | 145 | 75 | 162 |
| tc # 230° C. | 244 | 138 | 261 |

Faster crystallization kinetics are indicated by higher Tc's add smaller tc's at any given crystallization temperature, Tx. Comparing Examples I and II to Control A, we see that the addition of either nucleation aid results in higher Tc's and smaller tc's. Further, the addition of 1% PPS results in a higher Tc and smaller tc's at each crystallization temperature than the addition of 1% tak. Thus, the data indicates that PPS is not only effective at improving the crystallization rate of a poly(aryl ether ketone)/polyimide blend, it is also much more effective than talc.

Control B

A blend of 50% poly(aryl ether ketone) II and 50% poletherimide was made in a Brabender Plasticorder mixer at 380° C. The blend was found to be miscible as described in World Patent publication 8501-509A. Samples were heated to 400° C. in a DSC-2 calorimeter and tested as in Control A. the results are given in Table II.

Example III

A blend of 49.5% poly(aryl ether ketone) II, 49.5% polyetherimide, and 1% polyphenylene sulfide was made in a Brabender plasticorder mixer at 380° C. The blend was tested as in Control B and the results are given in Table II.

Control C

Poly(aryl ether ketone) II was fluxed in a Brabender at 380° C. for approximately 5 minutes. The resin was removed and tested as in Control A. The results are given in Table II.

Comparative Example IV

A blend of 99% poly(aryl ether ketone) II and 1% polyphenylene sulfide was mixed in a Brabender Plasticorder Mixer at 380° C. for approximately 5 minutes. The resin was removed and tested as in Control C. The results are given in Table II.

TABLE II

| Example | Control B | Example III | Control C | Example IV |
|---|---|---|---|---|
| Nucleation Aid | None | 1% PPS | None | 1% PPS |
| Tm (°C.) | 337 | 337 | 343 | 343 |
| ΔHf (cal/g) | 5.6 | 5.7 | 9.5 | 9.0 |
| tc #300° C. | — | — | 92 | 92 |
| tc #295° C. | — | — | 64 | 65 |
| tc #290° C. | — | 232 | 48 | 49 |
| tc #285° C. | — | — | 38 | 37 |
| tc #280° C. | 140 | 109 | 32 | 32 |
| tc #275° C. | — | — | 26 | 26 |
| tc #270° C. | 115 | 85 | 22 | 23 |
| tc #265° C. | — | — | — | 21 |
| tc #260° C. | 109 | 84 | — | — |
| tc #250° C. | 124 | 89 | — | — |
| tc #240° C. | 155 | 96 | — | — |
| tc #170° C. | — | — | 105 | 255 |

The data in Table II show that PPS is ineffective as a nucleating agent with poly(aryl ether ketones) per se. It is an excellent crystallization agent for poly(aryl ether ketone) blends.

What is claimed is:

1. A composition having increased crystallization rates comprising (a) from about 98 to about 99.9 percent by weight of a miscible blend comprising a poly(aryl ether ketone) and at least one amorphous polymer selected from the group consisting of polyetherimide, poly(amide-imide) and polyimide, and (b) from about 0.1 to about 2 percent by weight of poly(arylene sulfide) or a copolymer thereof having the following formula

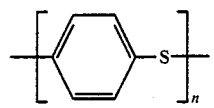

wherein n is at least 5.

2. A composition as defined in claim 1 wherein the poly(aryl ether ketone) contains repeating units of one or more of the following formulae:

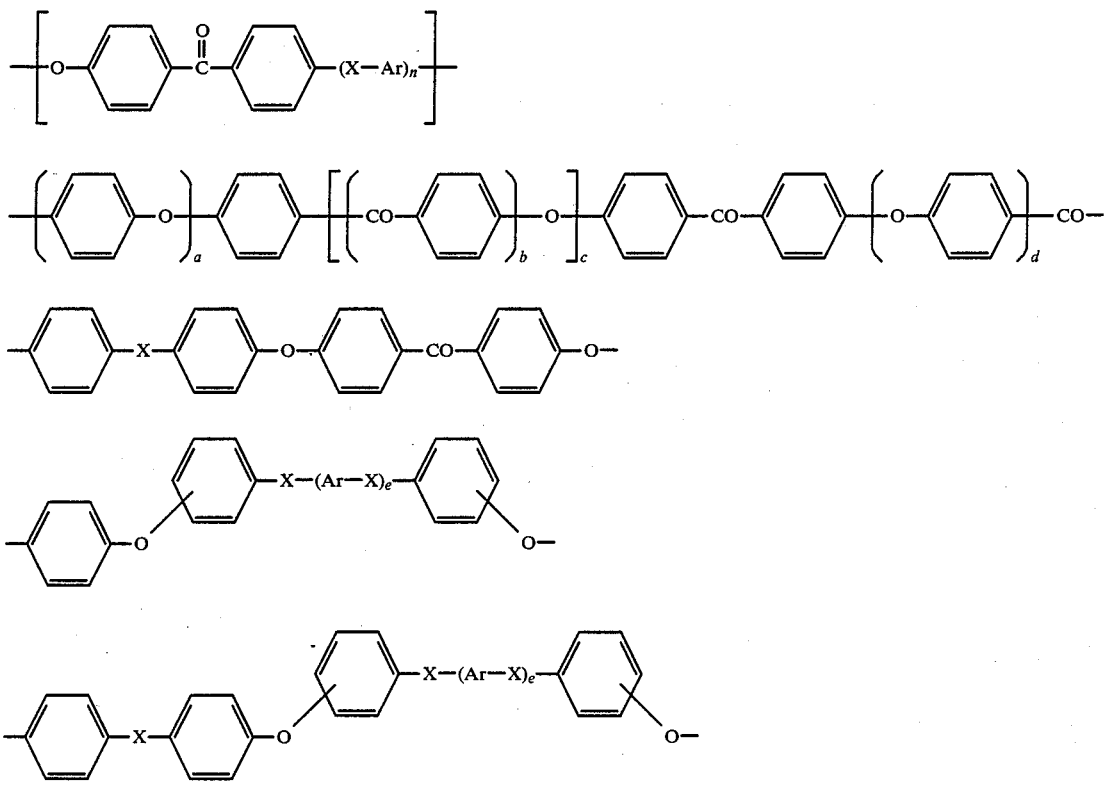
wherein Ar is independently a divalent aromatic radical selected from phenylene, biphenylene or naphthylene and like radicals; X is independently —O—,
or a direct bond; and n is an integer of from 0 to 3; b, c, d, and e are 0 to 1; and a is an integer of 1 to 4.
3. A composition as defined in claims 1 or 2 wherein the poly(aryl ether ketones) include those having repeating units of the formulae:
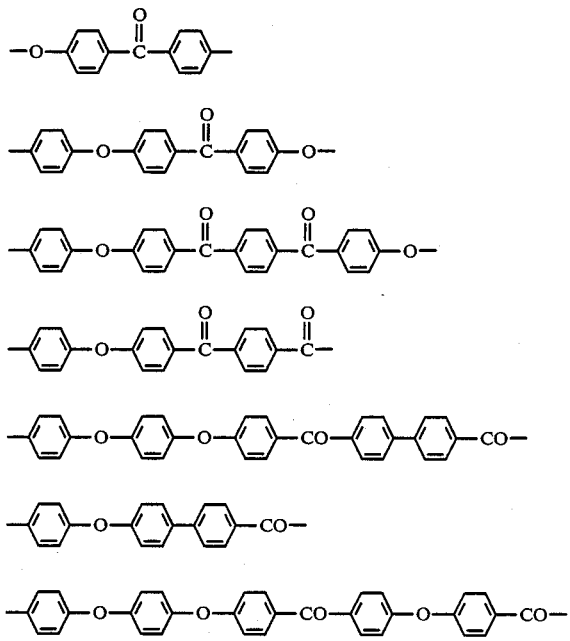

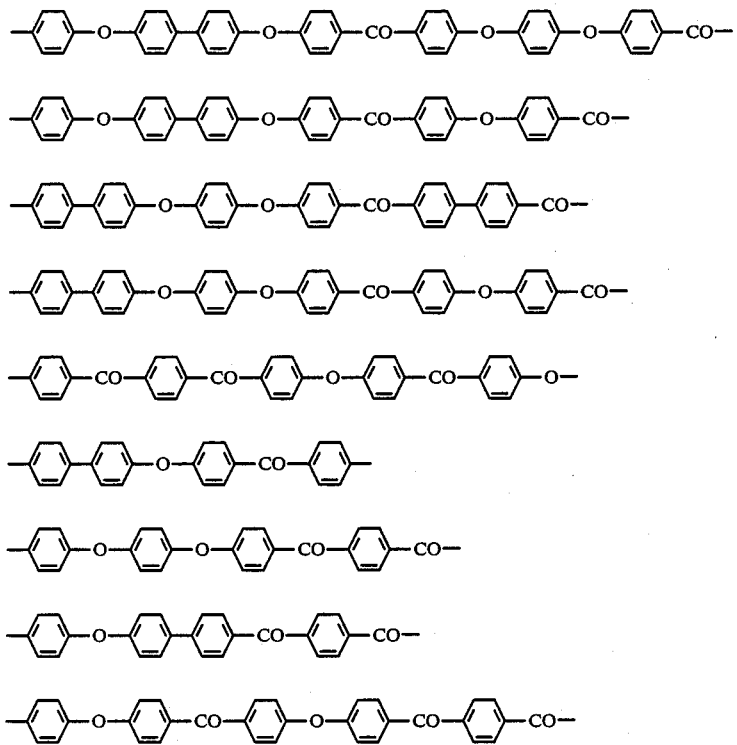

4. A composition as defined in claim 1 wherein the polyetherimide is of formula:

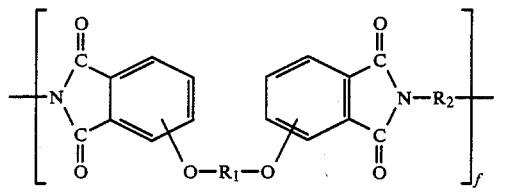

wherein f is an integer greater than 1, preferably from about 10 to about, 10,000 or more; —O—$R_1$—O— is attached to the 3 or 4 and 3 or 4, positions and $R_1$ is selected from
 (a) a substituted or unsubstituted aromatic radical such as:

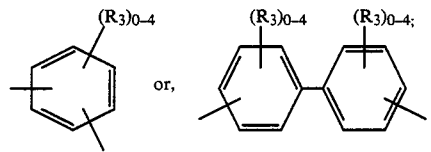

(b) a divalent radical of the formula:

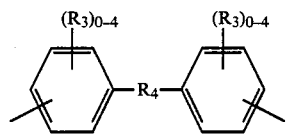

wherein $R_3$ is independently $C_1$ to $C_6$ alkyl, aryl, or halogen and $R_4$ is selected from —O—, —S—, $$-\overset{O}{\underset{\|}{C}}-,$$

$SO_2$—, —SO—, alkylene of 1 to 6 carbon atoms, cycloalkylene of 4 to 8 carbon atoms, alkylidene of 1 to 6 carbon atoms, or cycloalkylidene of 4 to 8 carbon atoms; $R_2$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formulae:

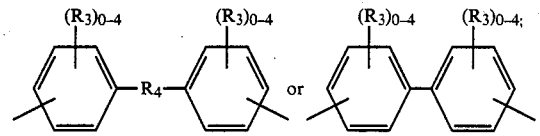

wherein $R_3$ and $R_4$ are as previously defined.

5. A composition as defined in claim 1 wherein the polyetherimide is of the formula

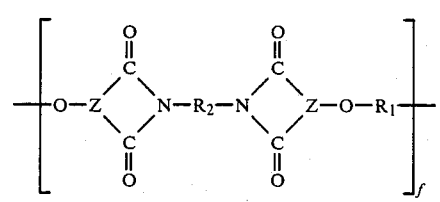

wherein —O—Z— is a member selected from

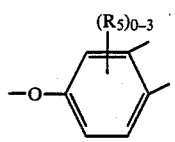

wherein $R_5$ is independently hydrogen, lower alkyl or lower alkoxy

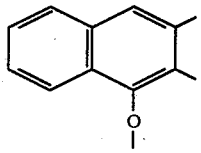

or isomers thereof, and

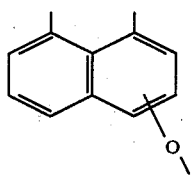

or isomers thereof wherein the oxygen may be attached to either ring and located ortho or para to one of the bonds of the imide carbonyl groups, and wherein $R_1$ and $R_2$ and f are as previously defined.

6. A composition as defined in claim 4 wherein the polyetherimide has repeating units of the formula:

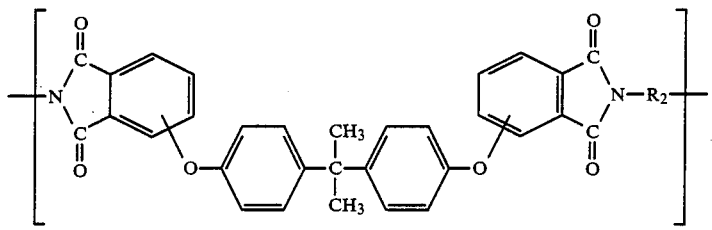

where $R_2$ is selected from

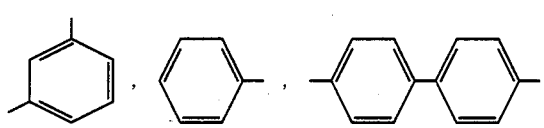

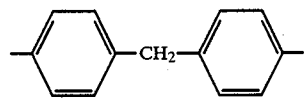

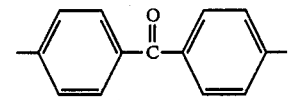

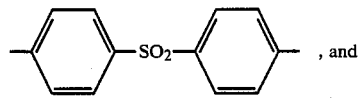, and

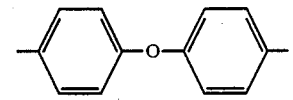

7. A composition as defined in claim 1 wherein the poly(arylene sulfide) is a poly(phenylene sulfide).

8. A composition as defined in claim 1 wherein the poly(phenylene sulfide) is of the formula:

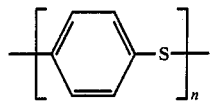

where n is 50 or higher.

9. A composition as defined in claim 1 wherein the poly(arylene sulfide) copolymer contains the units

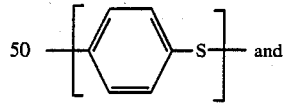 and

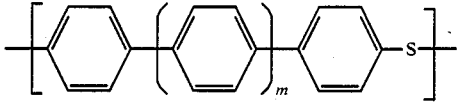

where m is 0 or 1.

* * * * *